(12) United States Patent
Arimilli et al.

(10) Patent No.: US 6,484,241 B2
(45) Date of Patent: *Nov. 19, 2002

(54) MULTIPROCESSOR COMPUTER SYSTEM WITH SECTORED CACHE LINE SYSTEM BUS PROTOCOL MECHANISM

(75) Inventors: Ravi Kumar Arimilli, Austin, TX (US); John Steven Dodson, Pflugerville, TX (US); Guy Lynn Guthrie, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 123 days.

This patent is subject to a terminal disclaimer.

(21) Appl. No.: 09/752,862

(22) Filed: Dec. 28, 2000

(65) Prior Publication Data

US 2002/0087791 A1 Jul. 4, 2002

(51) Int. Cl.[7] .............................................. G06F 12/00
(52) U.S. Cl. ..................... 711/141; 711/144; 711/146
(58) Field of Search ................................. 711/118, 122, 711/144, 145, 146, 154, 159

(56) References Cited

U.S. PATENT DOCUMENTS

| | | | |
|---|---|---|---|
| 4,755,930 A | * 7/1988 | Wilson, Jr. et al. | 711/122 |
| 5,611,071 A | * 3/1997 | Martinez, Jr. | 711/133 |
| 5,630,095 A | * 5/1997 | Snyder | 711/146 |
| 5,651,125 A | * 7/1997 | Witt et al. | 712/218 |
| 5,655,097 A | * 8/1997 | Witt et al. | 712/204 |
| 5,809,532 A | * 9/1998 | Eno et al. | 711/141 |
| 5,832,276 A | * 11/1998 | Feiste et al. | 710/240 |
| 9,752,863 | 12/2000 | Arimilli et al. | |
| 9,753,057 | 12/2000 | Arimilli et al. | |
| 6,279,085 B1 | * 8/2001 | Carpenter et al. | 711/143 |

OTHER PUBLICATIONS

U.S. patent application Ser. No. 09/753,057, Arimilli et al, filed Dec. 28,2000.

U.S. patent application Ser, No. 09/752,863, Arimilli et al. filed Dec. 28,2000.

\* cited by examiner

*Primary Examiner*—Tuan V. Thai
(74) *Attorney, Agent, or Firm*—Casimer K. Salys; Bracewell & Patterson, L.L.P.

(57) ABSTRACT

A method of maintaining coherency in a multiprocessor computer system wherein each processing unit's cache has sectored cache lines. A first cache coherency state is assigned to one of the sectors of a particular cache line, and a second cache coherency state, different from the first cache coherency state, is assigned to the overall cache line while maintaining the first cache coherency state for the first sector. The first cache coherency state may provide an indication that the first sector contains a valid value which is not shared with any other cache (i.e., an exclusive or modified state), and the second cache coherency state may provide an indication that at least one of the sectors in the cache line contains a valid value which is shared with at least one other cache (a shared, recently-read, or tagged state). Other coherency states may be applied to other sectors in the same cache line. Partial intervention may be achieved by issuing a request to retrieve an entire cache line, and sourcing only a first sector of the cache line in response to the request. A second sector of the same cache line may be sourced from a third cache. Other sectors may also be sourced from a system memory device of the computer system as well. Appropriate system bus codes are utilized to transmit cache operations to the system bus and indicate which sectors of the cache line are targets of the cache operation.

14 Claims, 4 Drawing Sheets

MULTIPROCESSOR COMPUTER SYSTEM WITH SECTORED CACHE LINE SYSTEM BUS PROTOCOL MECHANISM

CROSS-REFERENCES TO RELATED APPLICATIONS

The present invention is related to the following applications filed concurrently with this application, each of which is hereby incorporated: U.S. patent application Ser. No. 09/753,057 entitled "Multi Computer System with Sectored Cache Line Mechanism For Load and Store Operation " now pending; and U.S. patent application Ser. No. 09/752,863 entitled "Multiprocessor Computer System with Sectored Cache Line Mechanism for Cache Intervention ", now pending.

BACKGROUND OF THE INVENTION

1. Field of the Invention

The present invention generally relates to computer systems, specifically to multiprocessor computer systems having caches which share memory and are thus required to maintain cache coherency, and more particularly to an improved method of maintaining cache coherency in a cache architecture having sectored cache lines.

2. Description of Related Art

The basic structure of a conventional multiprocessor computer system 10 is shown in FIG. 1. Computer system 10 has several processing units, two of which 12a and 12b are depicted, which are connected to various peripheral devices, including input/output (I/O) devices 14 (such as a display monitor, keyboard, graphical pointer (mouse), and a permanent storage device or hard disk), memory device 16 (such as random access memory or RAM) that is used by the processing units to carry out program instructions, and firmware 18 whose primary purpose is to seek out and load an operating system from one of the peripherals (usually the permanent memory device) whenever the computer is first turned on. Processing units 12a and 12b communicate with the peripheral devices by various means, including a generalized interconnect or bus 20, or direct memory access channels (not shown). Computer system 10 may have many additional components which are not shown, such a serial, parallel, and universal system bus (USB) ports for connection to, e.g., modems, printers or scanners. There are other components that might be used in conjunction with those shown in the block diagram of FIG. 1; for example, a display adapter might be used to control a video display monitor, a memory controller can be used to access memory 16, etc. The computer can also have more than two processing units.

In a symmetric multi-processor (SMP) computer, all of the processing units are generally identical, that is, they all use a common set or subset of instructions and protocols to operate, and generally have the same architecture. A typical architecture is shown in FIG. 1. A processing unit includes a processor core 22 having a plurality of registers and execution units, which carry out program instructions in order to operate the computer. An exemplary processing unit includes the PowerPC™ processor marketed by International Business Machines Corp. The processing unit can also have one or more caches, such as an instruction cache 24 and a data cache 26, which are implemented using high speed memory devices. Caches are commonly used to temporarily store values that might be repeatedly accessed by a processor, in order to speed up processing by avoiding the additional latency of loading the values from memory 16. These caches are referred as "on-board" when they are integrally packaged with the processor core on a single integrated chip 28. Each cache is associated with a cache controller (not shown) that manages the transfer of data and instructions between the processor core and the cache memory.

A processing unit can include additional caches, such as cache 30, which is referred to as a level 2 (L2) cache since it supports the on-board (level 1) caches 24 and 26. In other words, cache 30 acts as an intermediary between memory 16 and the on-board caches, and can store a much larger amount of information (instructions and data) than the on-board caches can, but at a longer access penalty. For example, cache 30 may be a chip having a storage capacity of 512 kilobytes, while the processor may be an IBM PowerPC™ 604-series processor having on-board caches with 64 kilobytes of total storage. Cache 30 is connected to bus 20, and all loading of information from memory 16 into processor core 22 must come through cache 30. Although FIG. 1 depicts only a two-level cache hierarchy, multi-level cache hierarchies can be provided where there are many levels (L3, L4, etc.) of serially connected caches.

In a multi-level cache, if a copy of a value is in every level of the cache, the cache hierarchy is referred to as being "inclusive." It is not necessary, however, to keep a copy of each value in the lower levels, and an inclusivity bit field may be added to the caches to indicate whether or not the cache is inclusive. For example, a three-level cache structure might provide an L3 cache which was not inclusive, such that a value residing in the L2 cache might not be present in the L3 cache. In this example, if an L2 cache issues a read command for a value that is not present in any of the caches of that processing unit, it can be passed to that L2 cache without (necessarily) loading it into the L3 cache.

In an SMP computer, it is important to provide a coherent memory system, that is, to cause write operations to each individual memory location to be serialized in some order for all processors. By way of example, assume a location in memory is modified by a sequence of write operations to take on the values: 1, 2, 3, 4. In a cache coherent system, all processors will observe the writes to a given location to take place in the order shown. However, it is possible for a processing element to miss a write to the memory location. A given processing element reading the memory location could see the sequence 1, 3, 4, missing the update to the value 2. A system that implements these properties is said to be "coherent". Nearly all coherency protocols operate only to the granularity of the size of a cache block. That is to say, the coherency protocol controls the movement of and write permissions for operand data or instructions on a cache block basis, and not separately for each individual memory location.

There are a number of protocols. and techniques for achieving cache coherence that are known to those skilled in the art. All of these mechanisms for maintaining coherency require that the protocols allow only one processor to have a "permission" that allows a write operation to a given memory location (cache block) at any given point in time. As a consequence of this requirement, whenever a processing element attempts to write to a memory location, it must first inform all other processing elements of its desire to write the location and receive permission from all other processing elements to carry out the write.

To implement cache coherency in a system, the processors communicate over a common generalized interconnect (i.e., bus 20). The processors pass messages over the interconnect indicating their desire to read from or write to memory locations. When an operation is placed on the interconnect, all of the other processors "snoop" (monitor) this operation and decide if the state of their caches can allow the requested operation to proceed and, if so, under what conditions. There are several bus transactions that require snooping and follow-up action to honor the bus transactions and maintain memory coherency. The snooping operation is triggered by the receipt of a qualified snoop request, generated by the assertion of certain bus signals. Instruction processing is interrupted only when a snoop hit occurs and the snoop state machine determines that an additional cache snoop is required to resolve the coherency of the offended sector.

This communication is necessary because, in systems with caches, the most recent valid copy of a given block of memory may have moved from the system memory 16 to one or more of the caches in the system (as mentioned above). If a processor (say 12a) attempts to access a memory location not present within its cache hierarchy, the correct version of the block, which contains the actual (current) value for the memory location, may either be in the system memory 16 or in one of more of the caches in another processing unit, e.g. processing unit 12b. If the correct version is in one or more of the other caches in the system, it is necessary to obtain the correct value from the cache(s) in the system instead of system memory.

For example, consider a processor, say 12a, attempting to read a location in memory. It first polls its own L1 cache (24 or 26). If the block is not present in the L1 cache, the request is forwarded to the L2 cache (30). If the block is not present in the L2 cache, the request is forwarded on to lower cache levels, e.g., the L3 cache. If the block is not present in the lower level caches, the request is then presented on the generalized interconnect (20) to be serviced. Once an operation has been placed on the generalized interconnect, all other processing unit snoop the operation and determine if the block is present in their caches. If a given processing unit has the block requested by processing unit in its L1 cache, and the value in that block is modified, and any lower level caches also have copies of the block, then their copies are stale, since the copy in the processor's cache is modified. Therefore, when the lowest level cache (e.g., L3) of the processing unit snoops the read operation, it will determine that the block requested is present and modified in a higher level cache. When this occurs with an in-line cache structure, the L3 cache places a message on the generalized interconnect informing the processing unit that it must "retry" it's operation again at a later time, because the actual value of the memory location is in the L1 cache at the top of the memory hierarchy and must be retrieved to make it available to service the read request of the initiating processing unit.

Once the request from an initiating processing unit has been retried, the L3 cache begins a process to retrieve the modified value from the L1 cache and make it available at the L3 cache, main memory or both, depending on the exact details of the implementation. To retrieve the block from the higher level caches, the L3 cache sends messages through the inter-cache connections to the higher level caches, requesting that the block be retrieved. These messages propagate up the processing unit hierarchy until they reach the L1 cache and cause the block to be moved down the hierarchy to the lowest level (L3 or main memory) to be able to service the request from the initiating processing unit.

The initiating processing unit eventually re-presents the read request on the generalized interconnect. At this point, however, the modified value has been retrieved from the L1 cache of a processing unit and placed into system memory, and the read request from the initiating processor will be satisfied. The scenario just described is commonly referred to as a "snoop push". A read request is snooped on the generalized interconnect which causes the processing unit to "push" the block to the bottom of the hierarchy to satisfy the read request made by the initiating processing unit.

Thus, when a processor wishes to read or write a block, it must communicate that desire with the other processing units in the system in order to maintain cache coherence. To achieve this, the cache coherence protocol associates with each block in each level of the cache hierarchy, a status indicator indicating the current "state" of the block. The state information is used to allow certain optimizations in the coherency protocol that reduce message traffic on the generalized interconnect and the inter-cache connections. As one example of this mechanism, when a processing unit executes a read it receives a message indicating whether or not the read must be retried (i.e., reissued later). If the read operation is not retried, the message usually also includes information allowing the processing unit to determine if any other processing unit also has a still active copy of the block (this is accomplished by having the other lowest level caches give a "shared" or "not shared" indication for any read they do not retry). Therefore, a processing unit can determine whether any other processor in the system has a copy of the block. If no other processing unit has an active copy of the block, the reading processing unit marks the state of the block as "exclusive". If a block is marked exclusive it is permissible to allow the processing unit to later write to the block without first communicating with other processing units in the system because no other processing unit has a copy of the block. Therefore, it is possible for a processor to read or write a location without first communicating this intention onto the interconnection, but only where the coherency protocol has ensured that no other processor has an interest in the block.

The foregoing cache coherency technique is implemented in a specific protocol referred to as "MESI." In this protocol, a cache block can be in one of four states, "M" (Modified), "E" (Exclusive), "S" (Shared) or "I" (Invalid). Under the MESI protocol, each cache entry (e.g., a 32-byte sector) has two additional bits which indicate the state of the entry, out of the four possible states. Depending upon the initial state of the entry and the type of access sought by the requesting processor, the state may be changed, and a particular state is set for the entry in the requesting processor's cache. For example, when a sector is in the Modified state, the addressed sector is valid only in the cache having the modified sector, and the modified value has not been written back to system memory. When a sector is Exclusive, it is present only in the noted sector, and is consistent with system memory. If a sector is Shared, it is valid in that cache and in at least one other cache, all of the shared sectors being consistent with system memory. Finally, when a seoctor is Invalid, it indicates that the addressed sector is not resident in the cache.

A further improvement in accessing cache blocks can be achieved using the cache coherency protocol. This improvement, referred to as "intervention," allows a cache having control over a memory block to provide the data in that block directly to another cache requesting the value (for a read-type operation), in other words, bypassing the need to write the data to system memory and then have the requesting processor read it back again from memory. Intervention can generally be performed only by a cache having the value in a block whose state is Modified or Exclusive. In both of these states, there is only one cache block that has a valid copy of the value, so it is a simple matter to source (write) the value over the bus 20 without the necessity of first writing it to system memory. The intervention procedure thus speeds up processing by avoiding the longer process of writing to and reading from system memory (which actually involves three bus operations and two memory operations). This procedure not only results in better latency, but also increased bus bandwidth.

There are many variations of the MESI protocol. The tagged ("T") state is used to identify a cache block which is inconsistent with system memory (i.e. modified) and is further responsible for writing the correct (current) value to memory upon deallocation (or to pass on the tag to another cache block during intervention). The T state can be used to a modified value, by marking one of the sharing blocks as (temporarily) responsible for maintaining a valid copy of the value. The recently read ("R") state can be used to allow intervention when the value is unmodified but shared among many caches, so as to conveniently mark a single one of the sharing caches as being responsible for intervention. The hover ("H") state allows a cache line to maintain an address in the directory even though the corresponding value in the cache entry array is an invalid copy, so that it can snoop the correct value for its processing unit if the value happens to be broadcast as part of an intervention between the caches of two other processing units.

While the foregoing techniques are very useful in facilitating shared use of the system memory among the various caches, there are still several inefficiencies in these designs, particularly for sectored caches. For example, a 128-byte cache line may be divided into four 32-byte sectors, with each of the four sectors containing valid data. If a store operation writes new data to one of the sectors, the entire cache line must be invalidated, even though three of the four sectors in the line are still valid. Thereafter, if the processing unit associated with that cache issues a request to read one of the three valid sectors, the entire cache line must be obtained from elsewhere in the memory hierarchy (either from system memory, or from another cache via intervention), even though the valid data is already present in the cache. Although separate coherency bits could be provided for each of the sectors, this approach would effectively remove the benefits that are otherwise achieved from sectoring.

In light of the foregoing, it would be desirable to devise an improved method of handling cache transactions which did not require the invalidation of otherwise valid sectors in a cache line. It would be further advantageous if the method could also provide for more efficient cache intervention.

SUMMARY OF THE INVENTION

It is therefore one object of the present invention to provide an improved method of maintaining cache coherency in a multiprocessor system.

It is another object of the present invention to provide such a method which does not require invalidation of portions of a sectored cache line when one sector becomes invalid.

It is yet another object of the present invention to provide such a method which allows for partial intervention of requested data, that is, intervention by transmitting less than the entire cache line.

The foregoing objects are achieved in a method of maintaining coherency among a plurality of caches each associated with a respective processing unit of a multiprocessor computer system, wherein each of the caches has a plurality of cache lines, and each of the cache lines is divided into a plurality of sectors, the sectors having a smaller granularity than the cache lines, the method generally comprising the steps of assigning a first cache coherency state to a first sector of a cache line of one of the caches, and assigning a second cache coherency state, different from the first cache coherency state, to the cache line while maintaining the first cache coherency state for the first sector of the cache line. For example, the first cache coherency state may provide an indication that the first sector contains a valid value which is not shared with any other cache (i.e., an exclusive or modified state). Also, the second cache coherency state may provide an indication that at least one of the sectors in the cache line contains a valid value which is shared with at least one other cache (a shared, recently-read, or tagged state). Other coherency states may be applied to other sectors in the same cache line. Partial intervention may be achieved by issuing a request to retrieve an entire cache line, and sourcing only a first sector of the cache line in response to the request. A second sector of the same cache line may be sourced from a third cache. Other sectors may also be sourced from a system memory device of the computer system as well. Appropriate system bus codes are utilized to transmit cache operations to the system bus and indicate which sectors of the cache line are targets of the cache operation.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

FIG. 2, comprises

DESCRIPTION OF AN ILLUSTRATIVE EMBODIMENT

Figure 1:
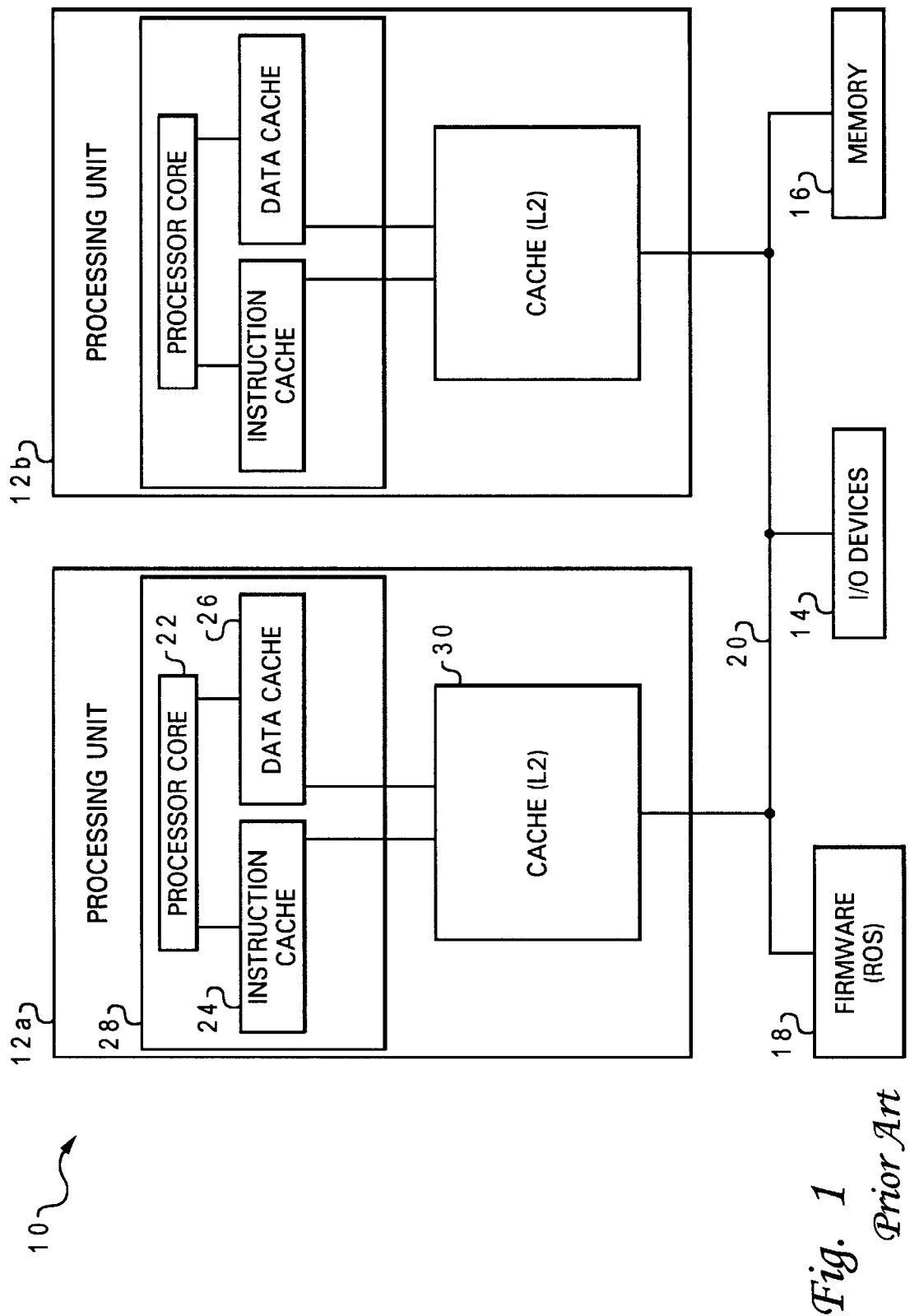
FIG. 1 is a block diagram of a prior art multiprocessor computer system.
Figure 2A:
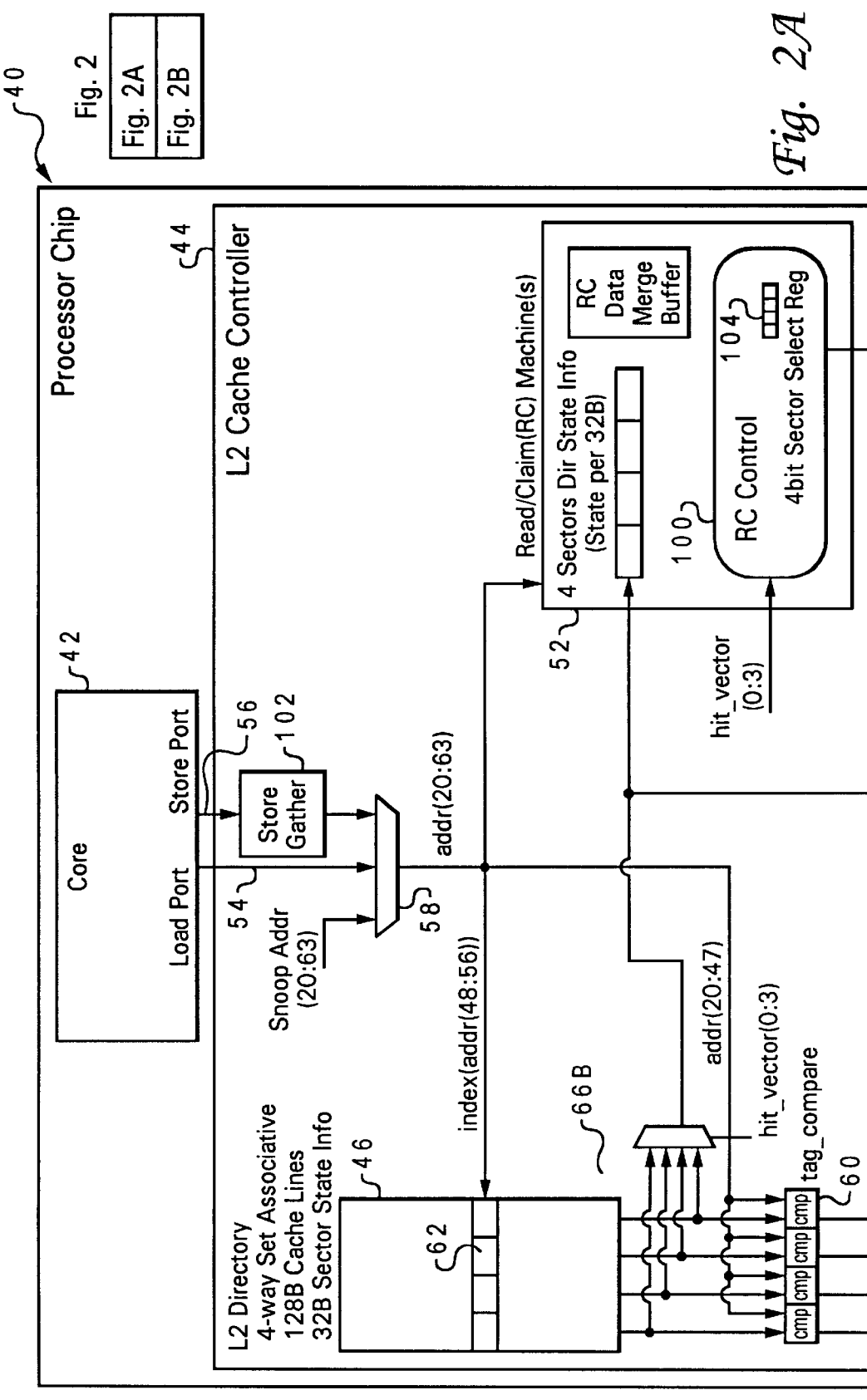
FIG. 2A and FIG. 2B, is a block diagram of one embodiment of a processing unit of a multiprocessor computer system constructed in accordance with the present invention, depicting the use of sectored cache lines having separate cache coherency states for each sector.
Figure 2B:
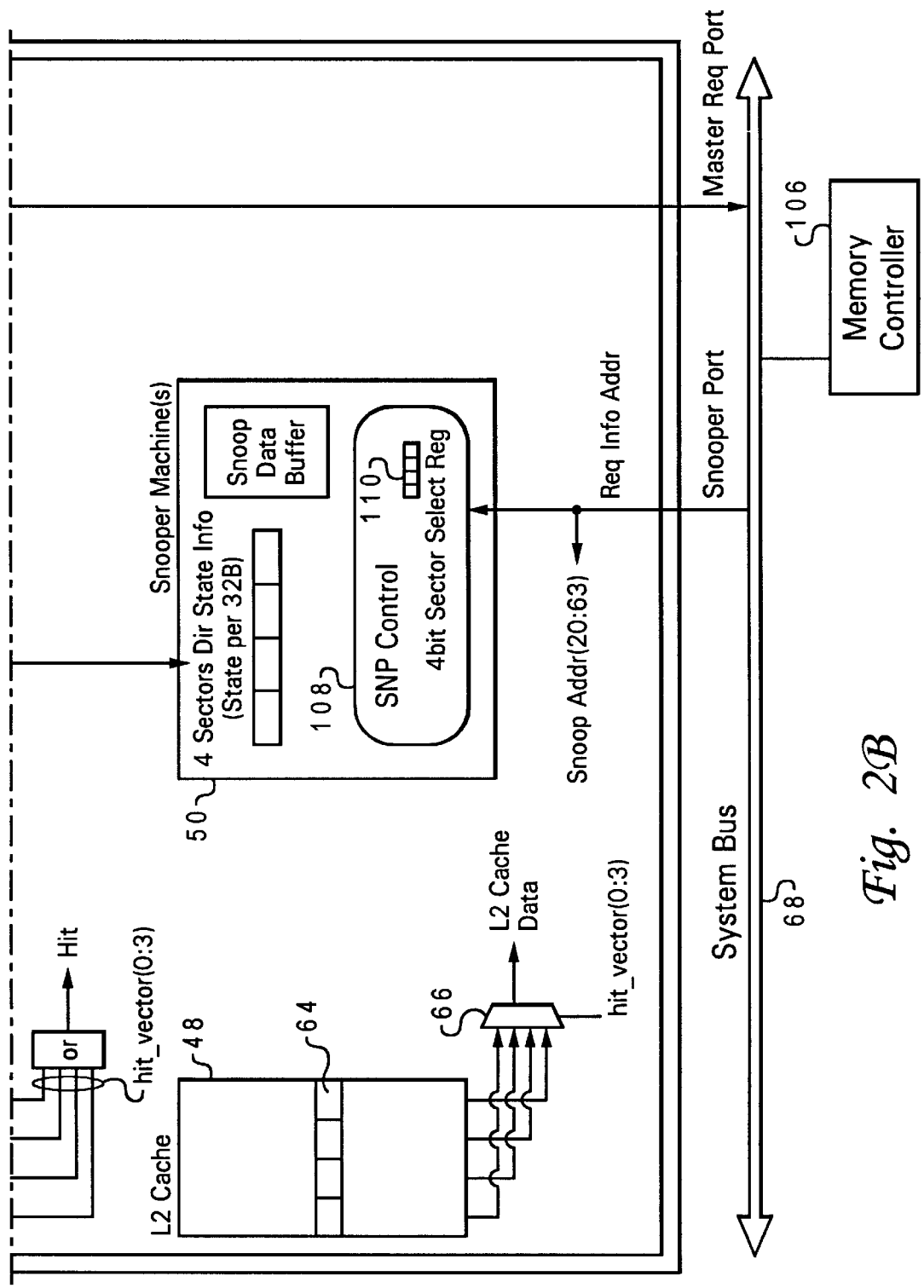

With reference now to the figures, and in particular with reference to FIG. 2, there is depicted one embodiment 40 of a processing unit of a multiprocessor computer system constructed in accordance with the present invention. While the present invention is directed to a method of handling cache operations in a memory-coherent, multiprocessor system such as the system of FIG. 2, the present invention could be applied to computer systems that have additional hardware components not shown in FIG. 2, or having a different interconnection architecture (or both), so those skilled in the art will appreciate that the present invention is not limited to the generalized system shown in that figure.

Processing unit 40 is primarily comprised of a processor core 42 and L2 cache 44. Core 42 includes an L1 cache in this depiction, although it is not shown separately. L2 cache 44 includes a 4-way set associative L2 directory 46, an L2 cache entry array 48, one or more snooper machines 50, and one or more read/claim (RC) machines 52. Core 42 communicates with L2 cache 44 via load and store ports 54 and 56, provided as part of the load/store unit (LSU) of core 42. These address ports are provided as inputs to a multiplexor 58 whose output is fed to several tag comparators 60 used by L2 directory 46 to determine whether an access request "hits" or "misses" cache 44 (i.e., whether the requested address is contained in the L2 cache). In this example, 44 bits of the address addr(20:63) are included in the output of multiplexor 58, but only 28 bits addr(20:47) are fed to comparators 60. The other inputs to comparators 60 come from the address tags of the four members of index line 62 in the 4-way set associative L2 directory 46 where each member's address tag represents address(20:47) of the cache line residing in the L2 cache 48.

Each index line in the 4-way set associative L2 directory 46 corresponds to four 128B cache lines in cache entry array 48, e.g., the four directory entries in index line 62 corresponds to four 128B cache lines 64. The present invention is directed to a cache architecture in which the cache lines are sectored. Cache sectoring is generally known in the art, but the present invention provides a novel approach to cache coherency for a sectored cache, as explained further below. In the depicted embodiment, each cache line is 128 bytes long, with four sectors of 32 bytes each. Thus, each of the four cache lines 64 has four sectors per cache line, and index line 62 has four segments for each of the four lines, corresponding respectively to each of the four sectors of the four cache lines 64. Each input to comparators 60 from L2 directory 46 comes from a different one of these segments of index line 62. The outputs of comparators 60 are combined in a logical OR fashion to indicate a hit. When a hit is indicated, the particular comparator 60 having the high output is used to identify the hit vector which points to the appropriate cache line in the four 128B lines 64. This hit vector controls the selection for another multiplexor 66 whose output provides the L2 cache value (operand data or program instruction) to core 42. This hit vector also controls the selection of multiplexer 66B which provides to RC 52 the state information for each of the four 32B sectors of the 128B line hit.

In addition to examining the address information in L2 directory 46, it is also necessary to examine coherency state information concerning each of the sectors in order to determine if a valid copy of the requested value is present in cache 46. It may be that a previous version of the value was stored in cache 44, but an operation has overwritten that value in another processing unit of the multiprocessor computer system, such that the old copy in L2 cache entry array 48 is stale, that is, possibly incorrect. The present invention uses cache coherency state such as the modified, exclusive, shared and invalid states of the prior art MESI cache coherency protocol, with one important difference—the present invention applies the various, coherency states to different granularities depending upon the particular state.

In a preferred implementation of a cache coherency protocol according to the present invention, the exclusive and modified states are applied only at the sector (core) granularity (e.g., 32 bytes), while the invalid and shared states may be applied at the overall cache line (memory) granularity (e.g., 128 bytes), or at the sector granularity. Other coherency states may be used, such as the "R" (recently read) state described in the Background section. The "R" state may be applied to the overall cache line granularity as well.

Use of different granularities for different coherency states offers a combination of benefits which have previously been unobtainable. For example, in the simplest case wherein a particular requested value is present (valid) in cache 44, it is not necessary that the other three sectors in that cache line all be valid. In the prior art, a store operation from an adjacent processing unit to a different sector in the same cache line would result in the invalidation of the entire cache line. This result would thus require the entire cache line to be retrieved from the remainder of the memory hierarchy, even though the particular sector requested was actually valid in the cache, thereby increasing latency. With the present invention, this inefficiency is avoided. The state information for each of the four sectors of the cache line is passed to RC machine 52 and, when a hit is indicated on a load operation, the hit vector is used to check the coherency state for the particular sector. If the state for that sector is valid (in the exemplary implementation, exclusive, modified, recently read, or shared), then the L2 cache value is passed to a core interface unit (CIU—not shown in core 42, regardless of the states of the other sectors.

In addition to the coherency states that are assigned to each individual sector, the overall cache line can have a coherency state as well, for the above-noted states. For example, the overall cache line may be marked as recently read ("R"), even though some sectors are invalid.

If the address requested by core 42 is not present (valid) in cache 44, the value must be retrieved from elsewhere in the memory hierarchy, and loaded into cache 44. Retrieval is accomplished using RC. machine 52 which communicates with the system bus 68, as explained further below. If the block of memory corresponding to the cache line for the requested value is not present in cache 44, then a cache line in L2 cache entry array 48 must be made available. If the cache is full, a conventional technique may be used to evict a cache line, such as a least-recently used (LRU) algorithm. This invention uses a 4-way set associative directory in its example but it should be apparent to one skilled in the art that this invention could be easily applied to other directory structures (e.g. direct mapped directory).

Figure 3:
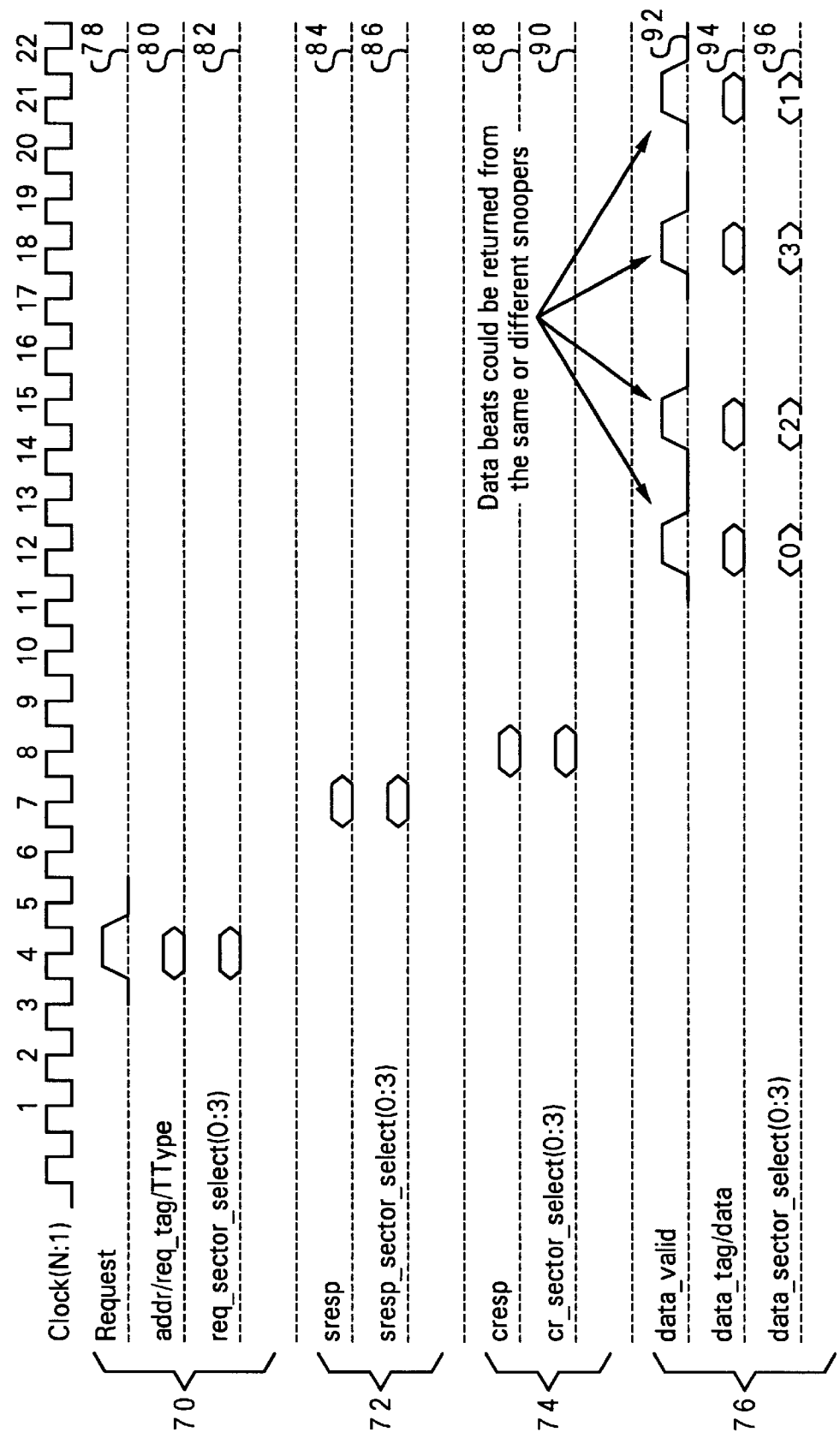
FIG. 3 is a timing diagram of various system bus signals which are utilized to implement a cache coherency protocol in accordance with the present invention wherein different coherency states can have different granularities.

Additional benefits of the present invention relating to both load and store operations may be gleaned from the timing diagram of FIG. 3. Four buses are shown, a request bus 70, a snoop response bus 72, a combined response bus 74, and a data bus 76. Request bus 70 has three signals. Request signal 78 indicates that a valid request is being presented on system bus 68. Address/tag/type signal 80 provides three values: a 44-bit address addr(20:63) involved in the transfer; the master request identifier req_tag(0:15) that is unique to each master; and the transfer type TType (0:7) which indicates the type of operation, e.g., load, read-with-intent-to-modify (RWITM), DClaim, kill, direct memory access (DMA) read, DMA write, etc. Sector request signal 82 is a 4-bit field req_sector_select(0:3) that indicates which 32-byte sector of the 128-byte line is being requested. Snoop response bus 72 has two signals. A snooper response sresp(0:3) is provided on signal 84, e.g., null (clean), retry, go_modified, go_shared, etc. Sector service signal 86 is a 4-bit field sresp sector select(0:3) that indicates which 32-byte sector of the 128-byte line is being serviced by this snooper. Combined response bus 74 has two signals. A combined response cresp(0:3) is provided on signal 88, e.g., retry, go_modified, go shared, etc. Combined sector signal 90 is a 4-bit field indicating the combined results of all the sresp_sector_select(0:3) signals. Data bus 76 has three signals. Valid signal 92 indicates that data is valid during this cycle on the system bus. Data/tag. signal 94 provides two values: the tag data_tag(0:15) which matches the master's tag sent with the initial request; and the data, data(0:63). Data sector signal 96 indicates which 32-byte sector this data represents.

The control logic 100 of RC machine 52 is adapted to handle 32-byte system bus requests. For example, RC machine 52 is able to perform a DClaim or RWITM request on the system bus based on the size of the store from store gathering station 102, and the results of the four coherency states. A 4-bit sector select register 104 is used to indicate which 32-byte sectors are involved in the store (or load) request from core 42. If more that one 32-byte sector is involved in the transfer (all four sectors could be involved), then multiple bits in sector select register 104 are set.

Various commands from RC machine 52 to system bus 68 may be provided to support sector requests. In the event that a store operation is directed to a 128-byte line and all of the 32-byte sectors involved are already in L2 cache 44 in the modified state, then no system bus action is required at all (the store can be committed immediately to the L2 cache). For a DClaim operation, if any of the four sector bits indicate that a sector of the relevant line is shared, then RC machine 52 issues a system bus code for the DClaim operation and sets the req_sector_select(0:3) field to indicate which sectors the RC machine is requesting for the operation (one or more of these bits may be set). For a RWITM operation, if any of the four sector bits indicate that a sector is invalid, then RC machine 52 issues a system bus code for the RWITM operation and sets the req_sector_select(0:3) field to indicate which sectors the RC machine is requesting for the operation (one or more of these bits may again be set). For a load operation, RC machine 52 may ask for all 128 bytes, by setting all four of the req_sector_select(0:3) bits. Nevertheless, RC machine 52 may ask for a subset of the line, for any reason, such as a LARX (load-and-reserve) request involved in acquiring a lock variable, which usually has a granularity smaller than the full cache line. RC machine 52 can also perform a traditional load/RWITM/DClaim (of the full 128-byte line) by simply turning on all of the sector select bits in the system bus command.

Each cache also includes a snooper 50 which is adapted to handle the 32-byte system bus requests. Snooper machine 50 accepts a load/RWITM/DClaim request from system bus 68 based on req _sector _select(0:3) which was sent by another L2 master RC machine (i.e., of a processing unit other than processing unit 40). The control logic 108 of snoop machine 50 also includes a 4-bit sector select register 110. Because a given snooper may only have a portion (e.g., 32 bytes) of the line being requested, that snooper may only be able to intervene with that portion of the cache line. The snooper uses data _sector _select(0:3) to identify which portion it is returning. It is therefore possible for a master to request a load of all 128 bytes of a cache line and have four different snoopers deliver the four different sectors that they respectively have cached in a modified state.

Main memory can supply an incomplete portion of the line as well. For example, a first sector of a line may be modified in a first cache where the remaining sectors are invalid, and a second sector of the line may be modified in a second cache where the remaining sectors are likewise invalid, with no other caches having any valid copies of any of the sectors. In this scenario, the first and second caches will intervene with their respective sectors, and memory controller 106 will determine that the remaining two sectors need to be sourced by main memory.

Although the invention-has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of maintaining cache coherency in a multi-processor computer system having a plurality of processing units, wherein each of the processing units has at least one cache, each of the caches has a plurality of cache lines, and each of the cache lines is divided into a plurality of sectors, comprising the steps of:

assigning a first cache coherency state to a first sector of a cache line of a first one of the caches;

assigning a second cache coherency state, different from the first cache coherency state, to the cache line while maintaining the first cache coherency state for the first sector of the cache line of the first cache; and issuing a system bus code from the first cache to a system bus indicating that the first sector of the cache line is a target of a cache operation of the first cache.

2. The method of claim 1 wherein said issuing step issues the system bus code to further indicate that a second sector of the cache line is also a target of the cache operation.

3. The method of claim 1 wherein:

the first cache coherency state indicates that the first sector of the cache line is shared with at least one other cache; and said issuing step issues the system bus code to further identify that the first sector of the cache line is a target of a DClaim operation.

4. The method of claim 1 wherein:

the first cache coherency state indicates that the first sector of the cache line is shared with at least one other cache; and said issuing step issues the system bus code to further identify that the first sector of the cache line is a target of a read-with-intent-to-modify operation.

5. The method of claim 1 wherein said issuing step includes the step of setting at least one bit in a sector select register of the cache, the set bit being associated with the first sector of the cache line:.

6. The method of claim 5 wherein said setting step sets all of the bits in the sector select register of the cache to indicate that all of the sectors in the cache line are demanded.

7. The method of claim 1 further comprising the step of assigning a third cache coherency state to the first sector of the cache line in response to said issuing step.

8. A computer system comprising:

a system memory device;

a plurality of processing units each having a cache, each of said caches having a plurality of cache lines, and each of said cache lines being divided into a plurality of sectors;

bus means for interconnecting said system memory device and said processing units; and cache coherency means for assigning a first cache coherency state to a first sector of a cache line of a first one of said caches, assigning a second cache coherency state, different from the first cache coherency state, to said cache line while maintaining the first cache coherency state for said first sector of said cache line, and issuing a system bus code from said first cache to said bus means indicating that said first sector of the cache line is a target of a cache operation of said first cache.

9. The computer system of claim 8 wherein said cache coherency means issues the system bus code to further indicate that a second sector of the cache line is also a target of the cache operation.

10. The computer system of claim 8 wherein:

the first cache coherency state indicates that said first sector of said cache line is shared with at least one other cache; and said cache coherency means issues the system bus code to further identify that the first sector of said cache line is a target of a DClaim operation.

11. The computer system of claim 8 wherein:

the first cache coherency state indicates that said first sector of said cache line is shared with at least one other cache; and said cache coherency means issues the system bus code to further identify that the first sector of said cache line is a target of a read-with-intent-to-modify operation.

12. The computer system of claim 8 wherein said cache coherency means sets at least one bit in a sector select register of said cache, the set bit being associated with said first sector of said cache line.

13. The computer system of claim 12 wherein said cache coherency means sets all of the bits in said sector select register of said cache to indicate that all of the sectors in said cache line are demanded.

14. The computer system of claim 8 wherein cache coherency means further assigns a third cache coherency state to said first sector of said cache line in response to issuance of the system bus code.

* * * * *